United States Patent [19]

Shigenaka

[11] Patent Number: 4,960,974
[45] Date of Patent: Oct. 2, 1990

[54] METHOD OF ASSEMBLING A VEHICLE BODY PANEL MEMBER

[75] Inventor: Makoto Shigenaka, Hiroshima, Japan

[73] Assignee: Mazda Motor Corporation, Hiroshima, Japan

[21] Appl. No.: 361,953

[22] Filed: Jun. 6, 1989

[30] Foreign Application Priority Data

Jun. 11, 1988 [JP] Japan ................................ 63-144165

[51] Int. Cl.⁵ .............................................. B23K 9/00
[52] U.S. Cl. .................................. 219/137 R; 29/469; 219/125.1
[58] Field of Search ............... 29/783, 469; 219/125.1, 219/80, 137 R

[56] References Cited

U.S. PATENT DOCUMENTS 4,404,451 9/1983 Niikawa ................................ 219/80

FOREIGN PATENT DOCUMENTS 56-101584 7/1981 Japan .
57-149030 9/1982 Japan .
58-49283 4/1983 Japan .

Primary Examiner—Clifford C. Shaw
Attorney, Agent, or Firm—Sixbey, Friedman, Leedom & Ferguson

[57] ABSTRACT

A method of assembling a vehicle body panel member comprises the steps of coupling each adjacent two of subdivided outer panel components with each other to incorporate the subdivided outer panel components into an outer panel, fixing the outer panel a predetermined position, providing the outer panel fixed at the predetermined position with arc welding at a junction between two adjacent subdivided outer panel components appearing on an external surface of the outer panel, and coupling subdivided inner panel components with the outer panel having been subjected to the arc welding so that the subdivided inner panel components are disposed on the inside of the outer panel to form an inner panel and thereby the vehicle body panel member is obtained.

15 Claims, 4 Drawing Sheets

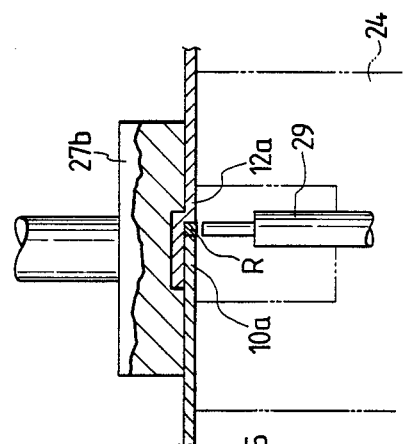
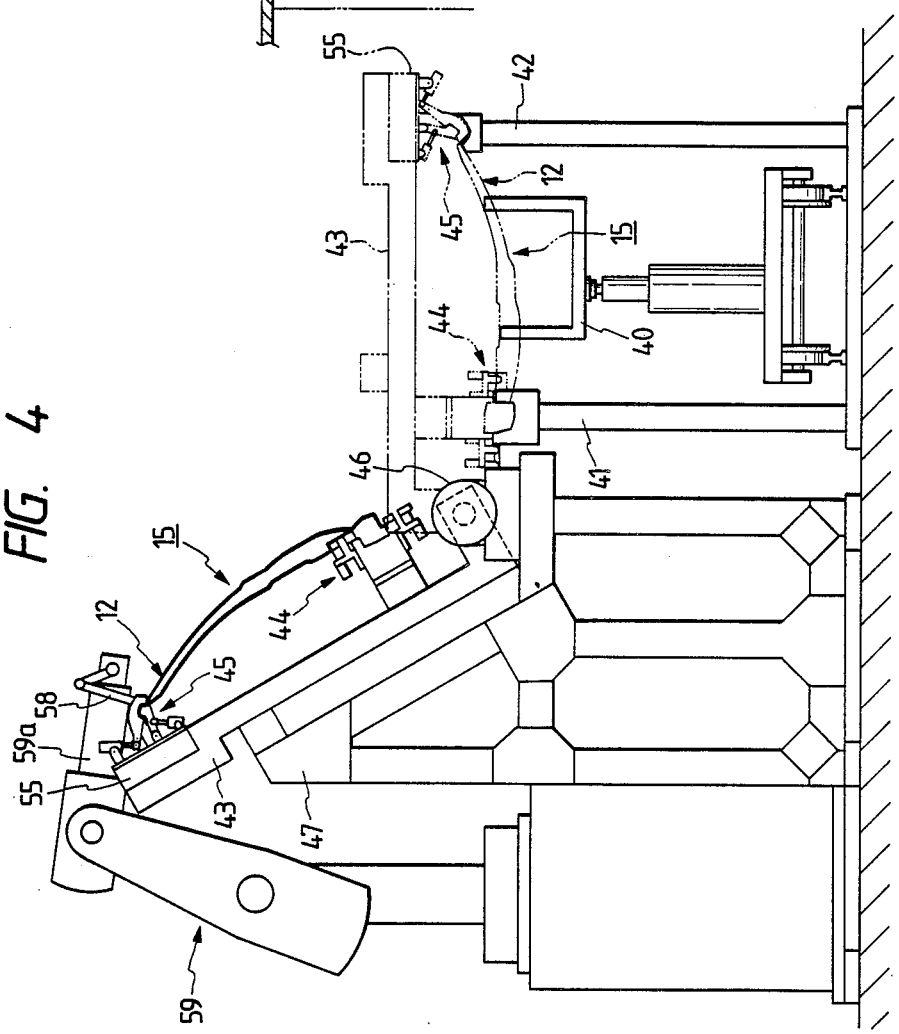
FIG. 3
FIG. 4

METHOD OF ASSEMBLING A VEHICLE BODY PANEL MEMBER

BACKGROUND OF THE INVENTION

The present invention relates to a method of assembling a vehicle body panel member, by which an outer panel which is composed of a plurality of subdivided outer panel components welded to be incorporated and is subjected to arc welding at a junction between two adjacent subdivided outer panel components appearing on its external surface and an inner panel which is composed of a plurality of inner panel components welded to be incorporated are coupled with each other to form the vehicle body panel member.

DESCRIPTION OF THE PRIOR ART

In a vehicle body assembly line, a body side panel member comprising an outer panel forming the exterior of a vehicle body and an inner panel coupled with the outer panel to be disposed on the inside of the latter is assembled to be incorporated with a floor panel member. In assembly of the body side panel member according to a previously proposed process, first, each adjacent two of subdivided outer panel components are coupled with each other by means of, for example, spot welding to be incorporated so that an outer panel is obtained, and each adjacent two of subdivided inner panel components are also coupled with each other by means of, for example, spot welding to be incorporated so that an inner panel is obtained. Then, the inner panel is attached to the output panel to be disposed on the inside of the latter so as to form the body side panel member and thereafter inert gas shielded metal arc welding (MIG welding) is carried out at a junction between two adjacent subdivided outer panel components appearing on the exterior surface of the outer panel forming the exterior of the body side panel member. The MIG welding usually provides a smooth welded surface.

In the event of the MIG welding on the external surface of the outer panel, it is required for obtaining a superior welded trace that respective portions of two adjacent subdivided outer panel components forming the junction therebetween on which the MIG welding is to be provided are securely fixed by clamping devices coming into contact with the exterior and interior surfaces of the adjacent subdivided outer panel components. However, since the inner panel is disposed on the inside of the outer panel, it is feared that the clamping device is obstructed by the inner panel from coming into contact with the internal surface of the adjacent subdivided outer panel components at position corresponding to the junction on which the MIG welding is to be provided and thereby the portions of the adjacent subdivided outer panel components forming the junction therebetween on which the MIG welding is to be provided are not secured sufficiently. In the case where the MIG welding is carried out on the external surface of the outer panel under a condition in which the portions of the adjacent subdivided outer panel components forming the junction therebetween on which the MIG welding is to be provided are not secured sufficiently, a favorable welded trace is not obtained on the junction and further the outer panel is undesirably deformed with heat resulting from the MIG welding.

In view of such problems, there has been proposed to form an opening on the inner panel so as to cause the same to face the portions of the adjacent subdivided outer panel components forming the junction therebetween on which the MIG welding is to be provided so that the clamping device can extend through the opening to come into contact with the internal surface of the adjacent subdivided outer panel components at the position corresponding to the junction on which the MIG welding is to be provided, as shown in, for example, the Japanese utility model application published before examination under publication number 58-9276. However, in such a case, extra manhours are necessitated for providing the inner panel with the opening and therefore the production cost of the body side panel member is undesirably increased.

OBJECTS AND SUMMARY OF THE INVENTION

Accordingly, it is an object of the present invention to provide a method of assembling a vehicle body panel member, by which an outer panel composed of a plurality of subdivided outer panel components and subjected to arc welding at a junction between two adjacent subdivided outer panel components appearing on its external surface and an inner panel composed of a plurality of inner panel components are coupled with each other to form the vehicle body panel member, and which avoids the aforementioned problems and disadvantages encountered with the prior art.

Another object of the present invention is to provide a method of assembling a vehicle body panel member, by which an outer panel composed of a plurality of subdivided outer panel components and subjected to arc welding at a junction between two adjacent subdivided outer panel components appearing on its external surface and an inner panel composed of a plurality of inner panel components are coupled with each other to form the vehicle body panel member, and in which the arc welding is carried out on the external surface of the outer panel under a condition wherein portions of the adjacent subdivided outer panel components forming the junction therebetween are fixed securely without inducing increase of the production cost of the vehicle body panel member.

A further object of the present invention is to provide a method of assembling a vehicle body panel member, by which an outer panel composed of a plurality of subdivided outer panel components and subjected to arc welding at a junction between two adjacent subdivided outer panel components appearing on its external surface and an inner panel composed of a plurality of inner panel components are coupled with each other to form the vehicle body panel member, and in which the arc welding is carried out on the external surface of the outer panel with a favorable welded trace and without undesirable deformations of a portion of the outer panel including the junction due to heat resulting from the arc welding.

According to the present invention, there is provided a method of assembling a vehicle body panel member comprising the steps of coupling each adjacent two of subdivided outer panel components with each other to incorporate the subdivided outer panel components into an outer panel, fixing the outer panel incorporated at a predetermined position, providing the outer panel fixed at the predetermined position with arc welding at a junction between two adjacent subdivided outer panel components appearing on an external surface of the outer panel, and coupling subdivided inner panel components with the outer panel having been subjected to the arc welding in such a manner that the subdivided inner panel components is disposed on the inside of the outer panel to form an inner panel attached to the outer panel and thereby the vehicle body panel member is obtained.

With the method thus comprising in accordance with the present invention, after the arc welding is provided at the junction between two adjacent subdivided outer panel components appearing on the exterior surface of the outer panel composed of the incorporated subdivided outer panel components, the inner panel is coupled with the outer panel to be disposed on the inside of the latter, and therefore, on the occasion of the arc welding on the exterior surface of the outer panel, portions of the adjacent subdivided outer panel components forming the junction therebetween can be fixed securely without inducing increase of the production cost of the vehicle body panel member. Further, in the method according to the present invention, the arc welding can be carried out on the external surface of the outer panel with a favorable welded trace and without undesirable deformations of a portion of the outer panel including the junction due to heat resulting from the arc welding.

The above, and other objects, features and advantages of the present invention will become apparent from the following detailed description which is to be read in conjunction of the accompanying drawings.

BRIEF DESCRIPTION OF THE DRAWINGS

FIG. 3 is a partial cross-sectional view use for explaining arc welding provided on an outer panel in accordance with an embodiment of method of assembling a vehicle body panel member according to the present invention;

FIG. 4 is an illustration showing another example of a welding station in which an outer panel is subjected to arc welding in accordance with an embodiment of method of assembling a vehicle body panel member according to the present invention.

DESCRIPTION OF THE PREFERRED EMBODIMENT

Now, an embodiment of method of assembling a vehicle body panel member according to the present invention will be described in detail with reference to the accompanying drawings hereinafter.

Figure 1C:
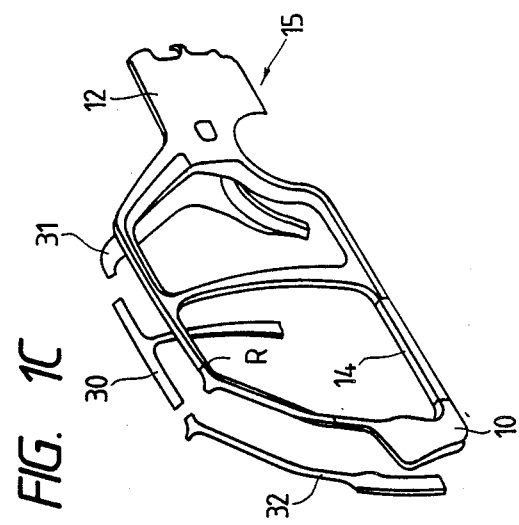
FIGS. 1A to 1D show schematic illustrations used for explaining processing steps in an embodiment of method of assembling a vehicle body panel member according to the present invention.
Figure 1D:
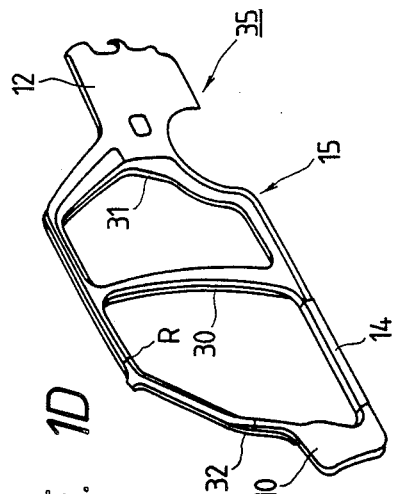
Figure 1A:
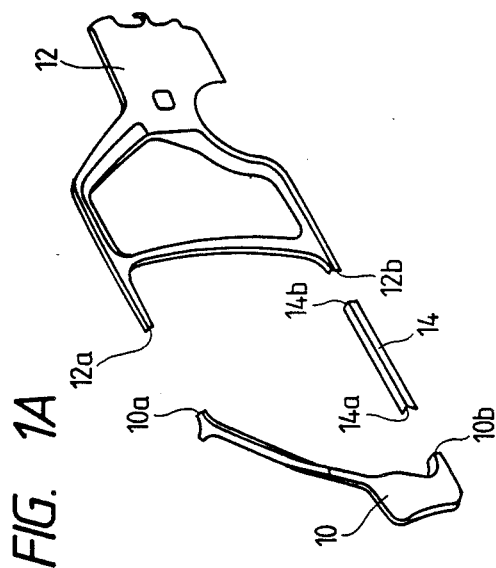

In the case where a body side panel member used for constituting a vehicle body is assembled in accordance with an example of the method according to the present invention, first, as shown in FIG. 1A, a front pillar outer component 10, a rear fender component 12 and a side sill component 14 are arranged to be stationary at respective predetermined positions. Then, a connecting portion 10a of the front pillar outer component 10 and a connecting portion 12a of the rear fender component 12 are coupled with each other by means of spot welding, a connecting portion 10b of the front pillar outer component 10 and a connecting portion 14a of the side sill component 14 are coupled with each other by means of spot welding, and a connecting portion 12b of the rear fender component 12 and a connecting portion 14b of the side sill component 14 are coupled with each other by means of spot welding, so that the front pillar outer component 10, rear fender component 12 and side sill component 14 are incorporated into an outer panel 15 which is used for forming the exterior of the vehicle body, as show in FIG. 1B.

Figure 1B:
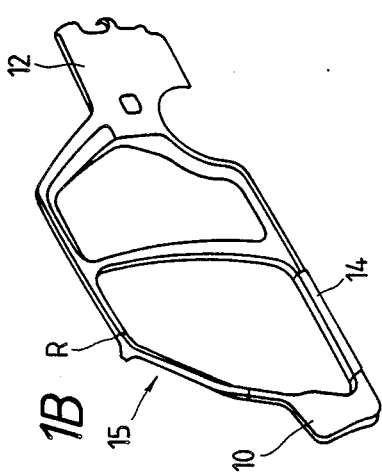

Next, MIG welding is carried out at a junction R between the front pillar outer component 10 and the rear fender component 12, at which the connecting portions 10a and 12a are welded with each other and which appears on the external surface of the outer panel 15, as shown in FIG. 1B.

After the MIG welding provided at the junction R on the external surface of the outer panel 15, a center pillar inner component 30, a rear pillar inner component 31 and a front pillar inner component 32, as shown in FIG. 1C, are connected by means of spot welding with the front pillar outer component 10 and the rear fender component 12 forming the outer panel 15 so as to form an inner panel disposed on the inside of the outer panel 15, so that a body side panel member 35 is formed with the outer panel 15 and the inner panel connected with the outer panel 15 to be disposed on the inside of the outer panel 15, as shown in FIG. 1D. Each of the center pillar inner component 30 and the front pillar inner component 32 is coupled with the outer panel 15 so as to have a portion thereof positioned on the inside of a portion of the outer panel 15 at which the junction R is formed.

Figure 2:
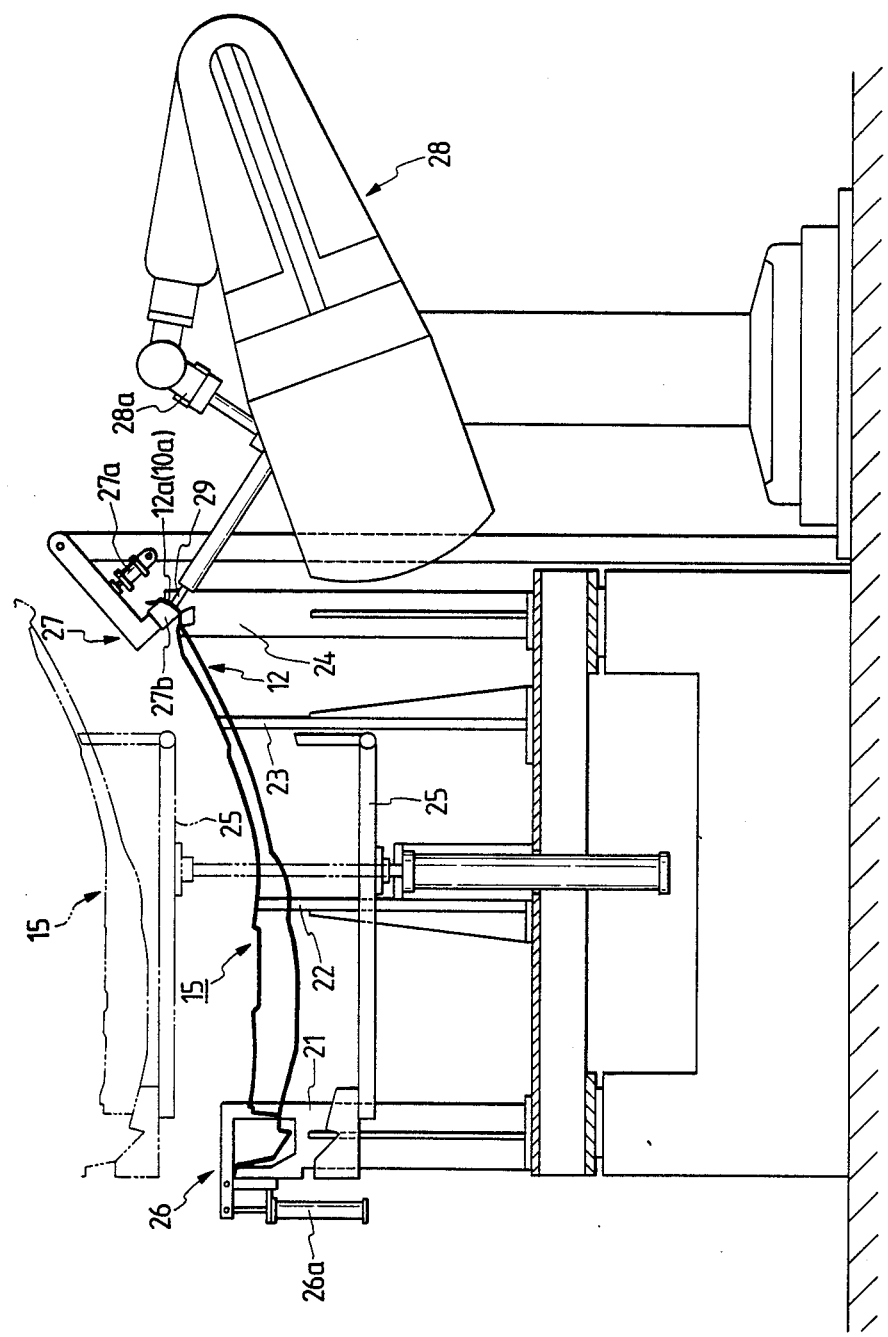
FIG. 2 is an illustration showing an example of a welding station in which an outer panel is subjected to arc welding in accordance with an embodiment of method of assembling a vehicle body panel member according to the present invention.

FIG. 2 shows an example of a welding station in which the outer panel 15 is subjected to the MIG welding provided at the junction R on its external surface. In the station shown in FIG. 2, the outer panel 15 is carried therein by a lifter 25 and shifted from the lifter 25 to be put on supporting stands 21, 22, 23 and 24 due to descent of the lifter 25. The outer panel 15 put on the supporting stands 21 to 24 has its external surface facing downward and is fixed on the supporting stands 21 to 24 by clamping devices 26 and 27 including driving cylinders 26a and 27a respectively. The clamping device 27 is operative to secure the connecting portion 10a of the front pillar outer component 10 and the connecting portion 12a of the rear fender component 12 which have been welded with each other to form the junction R on the external surface of the outer panel 15. When the connecting portions 10a and 12a are actually secured by the clamping device 27, the external surface of the connecting portion 10a and the external surface of the connecting portion 12a are supported by a top surface of the supporting stand 24, which is shaped to fit the external surfaces of the connecting portions 10a and 12a, and the internal surface of the connecting portion 10a and the internal surface of the connecting portion 12a are pressed down by an end portion 27b of the clamping device 27, which is shaped to fit the internal surfaces of the connecting portions 10a and 12a and caused by the driving cylinder 27a to come into contact with the internal surfaces of the connecting portions 10a and 12a for pushing the connecting portions 10a and 12a toward the top surface of the supporting stand 24.

After the outer panel 15 is fixed by the clamping devices 26 and 27, a welding electrode device 29 which is supported by an arm 28a of a robot 28 is caused to face the junction R formed on the external surface of the outer panel 15 by the connecting portion 10a of the front pillar outer component 10 and the connecting portion 12a of the rear fender component 12, and the MIG welding is provided on the junction R by the welding electrode device 29.

During the MIG welding thus carried out at the junction R, the end portion 27b of the clamping device 27 is easily and surely in contact with the internal surfaces of the connecting portions 10a and 12a, as shown in FIG. 3, and therefore the connecting portion 10a of the front pillar outer component 10 and the connecting portion 12a of the rear fender component 12 forming the junction R on the external surface of the outer panel 15 are secured sufficiently so that the MIG welding at the junction R is properly carried out and the outer panel 15 is prevented from being undesirably deformed with heat resulting from the MIG welding.

FIG. 4 shows another example of the welding station in which the outer panel 15 is subjected to the MIG welding provided at the junction R on its external surface. In the station shown in FIG. 4, the outer panel 15 is carried by a lifter 40 and shifted from the lifter 40 to be temporarily put on supporting stands 41 and 42 due to descent of the lifter 40, as shown with dot-dash lines in FIG. 4. The outer panel 15 temporarily put on the supporting stands 41 and 42 has its external surface facing downward.

Then, a movable frame 43 which is provided with holding devices 44 and 45 and operative to be rotated by a motor 46 is rotated clockwise to be positioned above the outer panel 15 temporarily put on the supporting stands 41 and 42, as shown with dot-dash lines in FIG. 4. The holding devices 44 and 45 are operative to contact with the outer panel 15 for holding the same firmly. Especially, the holding device 45 is operative to secure the connecting portion 10a of the front pillar outer component 10 and the connecting portion 12a of the rear fender component 12 which have been welded with each other to form the junction R on the external surface of the outer panel 15.

The movable frame 43 provided with the holding devices 44 and 45 holding the outer panel 15 is rotated counterclockwise, together with the outer panel 15, by the motor 46 to be supported to become stationary by a supporting structure 47 as shown with solid lines in FIG. 4, and on that occasion, the outer panel 15 is held by the holding devices 44 and 45 provided on the movable frame 43 so as to have its external surface facing upward.

Figure 5:
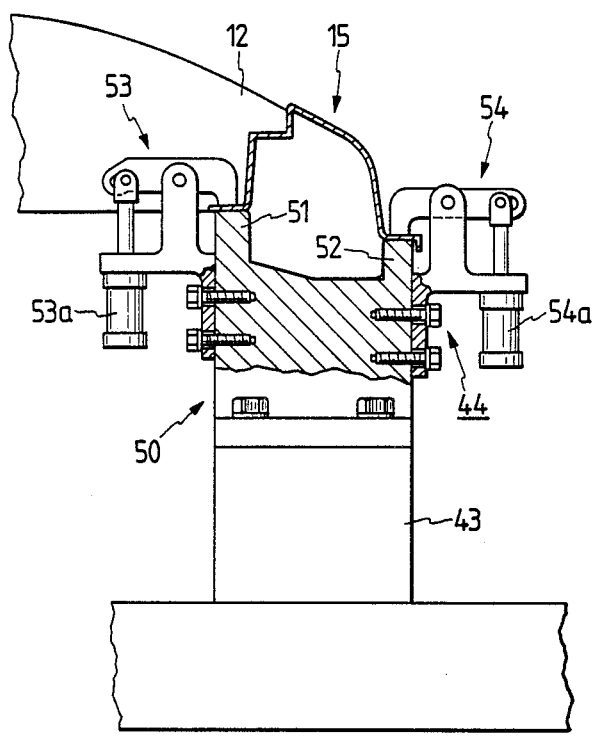
FIGS. 5 and 6 are schematic illustrations showing portions of the welding station shown in FIG. 5.

As shown in FIG. 5, the holding device 44 comprises a base 50 fixed to the movable frame 43 and provided thereon with panel receiving portions 51 and 52, a first movable clamper 53 having a driving cylinder 53a and mounted on the base 50 and a second movable clamper 54 having a driving cylinder 54a and mounted also on the base 50. When the outer panel 15 is actually held by the holding device 44, a portion of the rear fender component 12 forming the outer panel 15 is received on the inside thereof by the panel receiving portions 51 and 52 provided on the base 50 and clamped from the outside thereof by the first and second movable clampers 53 and 54 driven by the driving cylinders 53a and 54a respectively.

Figure 6:
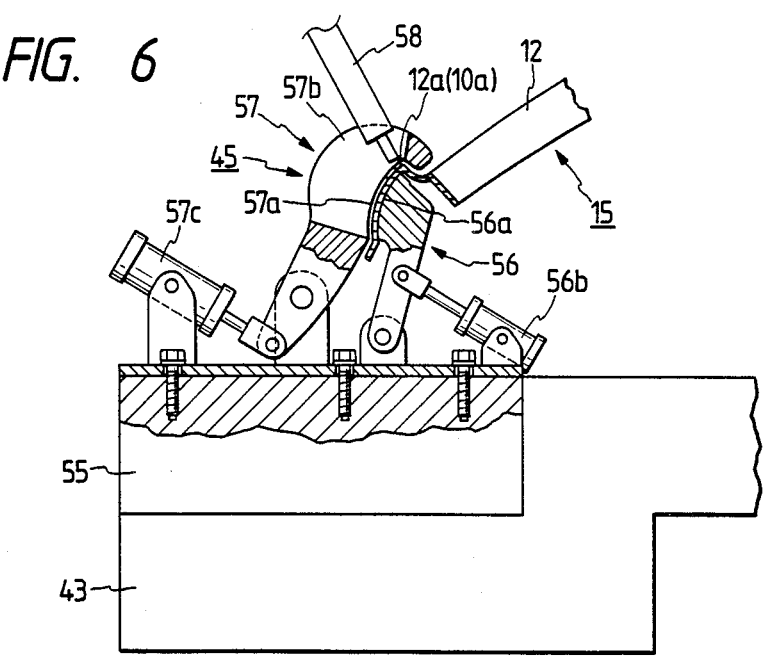

Further, as shown in FIG. 6, the holding device 45 comprises a base 55 fixed to the movable frame 43, a movable panel receiver 56 mounted to be rotatable on the base 55 and having a panel receiving surface 56a and a driving cylinder 56b secured to the base 55, and a movable clamper 57 mounted to be rotatable on the base 55 and having a panel pushing surface 57a, a slit 57b and a driving cylinder 57c secured to the base 55. When the connecting portion 10a of the front pillar outer component 10 and the connecting portion 12a of the rear fender component 12 forming the junction R on the external surface of the outer panel 15 is actually secured by the holding device 45, the movable panel receiver 56 is rotated counterclockwise by the driving cylinder 56b to cause the panel receiving surface 56a to come into contact with both the internal surface of the connecting portion 10a and the internal surface of the connecting portion 12a. The panel receiving surface 56a is shaped to fit the internal surfaces of the connecting portions 10a and 12a. Then, the movable clamper 57 is rotated clockwise by the driving cylinder 57c to cause the panel pushing surface 57a to come into contact with both the external surface of the connecting portion 10a and the external surface of the connecting portion 12a for pushing the connecting portions 10a and 12a toward the panel receiving surface 56a of the movable panel receiver 56. The panel pushing surface 57a is shaped to fit the external surfaces of the connecting portions 10a and 12a.

After the movable frame 43 is positioned to be supported by the supporting structure 47, together with the outer panel 15 which is secured by the holding device 44 and 45, as shown with solid lines in FIG. 4, a welding electrode device 58 which is supported by an arm 59a of a robot 59 is caused to face the junction R formed on the external surface of the outer panel 15 by the connecting portion 10a of the front pillar outer component 10 and the connecting portion 12a of the rear fender component 12, through the slit 57b provided on the movable clamper 57 as shown in FIG. 6, and the MIG welding is provided on the junction R by the welding electrode device 58.

In such a case, during the MIG welding thus carried out at the junction R, the panel receiving surface 56a of the movable panel receiver 56 and the panel pushing surface 57a of the movable clamper 57 both provided on the holding device 45 are surely in contact with the internal surfaces and the external surfaces of the connecting portions 10a and 12a, respectively, as shown in FIG. 3, and therefore the connecting portion 10a of the front pillar outer component 10 and the connecting portion 12a of the rear fender component 12 forming the junction R on the external surface of the outer panel 15 are secured sufficiently so that the MIG welding at the junction R is properly carried out and the outer panel 15 is prevented from being undesirably deformed with heat resulting from the MIG welding.

Although, in the above described embodiment, the body side panel member is assembled in accordance with one example of the method according to the present invention, the method according to the present invention in applicable also for assembling various vehicle body panel members other than the body side panel member.

What is claimed is:

1. A method of assembling a vehicle body panel member comprising the steps of, coupling each adjacent two of subdivided outer panel components with each other to incorporate the subdivided outer panel components into an outer panel by means of welding, fixing the incorporated outer panel at a predetermined position, providing the outer panel fixed at the predetermined position with arc welding at a junction between two adjacent subdivided outer panel components for smoothing welded panel surfaces thereof that appear on an external surface of the outer panel, and coupling subdivided inner panel components with the outer panel after the outer panel arc welding has been completed in such a manner that the subdivided inner panel components are disposed on the inside of the outer panel to form an inner panel attached to the outer panel and thereby the vehicle body panel member is obtained.

2. A method according to claim 1, wherein at least one of said subdivided inner panel components is coupled with the outer panel to be positioned on the inside of a portion of the outer panel at which said junction is formed.

3. A method according to claim 1, wherein said outer panel and said inner panel forms a body side panel member.

4. A method according to claim 3, wherein said subdivided outer panel components include a front pillar outer component, a rear fender component and a side sill component, and said arc welding is provided at a junction between said front pillar outer component and said rear fender component.

5. A method according to claim 4, wherein said arc welding is selected to be inert gas shield metal arc welding.

6. A method according to claim 1, wherein said arc welding is selected to be inert gas shield metal arc welding.

7. A method according to claim 1, wherein said outer panel is fixed to the predetermined position so as to have its external surface facing downward and said arc welding is provided at said junction facing downward.

8. A method according to claim 7, wherein pressing means is in contact with an internal surface of a portion of said outer panel having its external surface facing downward at which said junction is formed.

9. A method according to claim 7, wherein said arc welding is selected to be inert gas shield metal arc welding.

10. A method according to claim 1, wherein pressing means is in contact with an internal surface of a portion of the outer panel at which said junction is formed.

11. A method according to claim 1, wherein said outer panel is fixed to the predetermined position so as to have its external surface facing upward and said arc welding is provided at said junction facing upward.

12. A method according to claim 11, wherein said outer panel is temporarily positioned to have its external surface facing downward, then rotated to be fixed to the predetermined position to have its external surface facing upward so that the arc welding is provided at the junction facing upward, and further rotated to be positioned again to have its external surface facing downward.

13. A method according to claim 11, wherein pressing means is in contact with an internal surface of a portion of said outer panel fixed to have its external surface facing upward, at which said junction is formed.

14. A method according to claim 11, wherein said arc welding is selected to be inert gas shield metal arc welding.

15. A method according to claim 1, wherein said arc welding is carried out by means of a robot.

* * * * *